United States Patent [19]
Bixby

[11] 4,338,514
[45] Jul. 6, 1982

[54] APPARATUS FOR CONTROLLING EXPOSURE OF A SOLID STATE IMAGE SENSOR ARRAY

[75] Inventor: James A. Bixby, San Diego, Calif.

[73] Assignee: Spin Physics, Inc., San Diego, Calif.

[21] Appl. No.: 138,024

[22] Filed: Apr. 7, 1980

[51] Int. Cl.³ .............................................. G01J 1/20
[52] U.S. Cl. ..................................... 250/201; 250/578
[58] Field of Search ............. 250/201, 204, 209, 211 J, 250/578, 205; 357/24, 31, 32; 358/213; 356/222

[56] References Cited

U.S. PATENT DOCUMENTS

| | | | |
|---|---|---|---|
| 3,800,079 | 3/1974 | McNeil et al. | 358/213 |
| 3,898,676 | 8/1975 | Hosoe et al. | 354/25 |
| 3,904,818 | 9/1975 | Kovac | 250/211 J |
| 4,005,443 | 1/1977 | Albrecht | 250/201 |
| 4,047,187 | 9/1977 | Mashimo et al. | 250/201 |
| 4,131,919 | 12/1978 | Lloyd et al. | 358/213 |
| 4,225,883 | 9/1980 | Van Atta et al. | 358/213 |

*Primary Examiner*—David C. Nelms
*Attorney, Agent, or Firm*—Robert F. Cody

[57] ABSTRACT

An apparatus for controlling the exposure of a solid state image sensor array monitors the semiconductor substrate current produced as charge signal accumulates during an exposure of the array to radiant energy. The exposure of the array is controlled in response to an output signal representative of the total substrate current.

8 Claims, 7 Drawing Figures

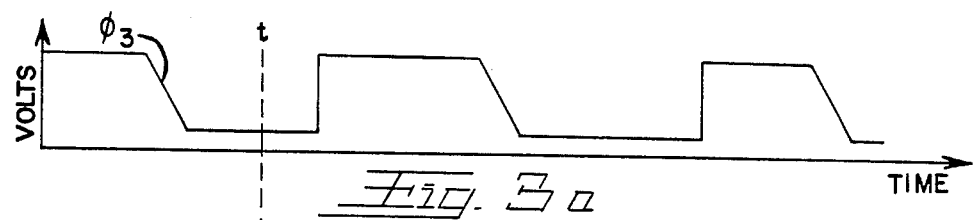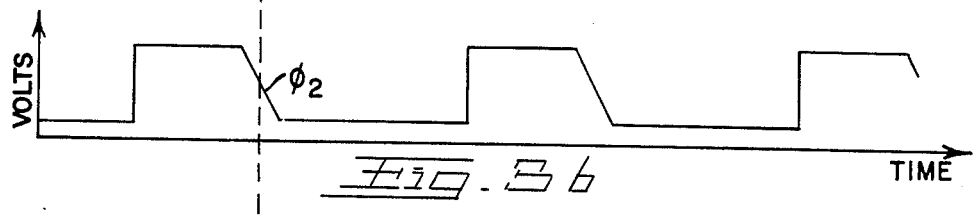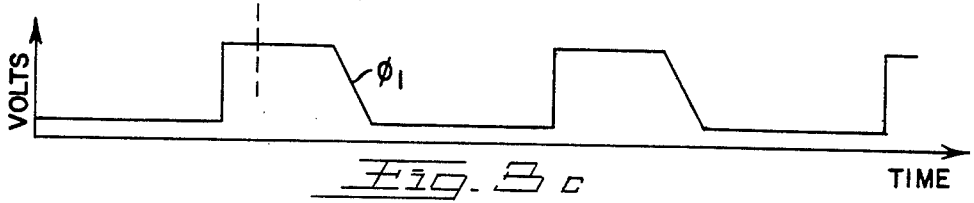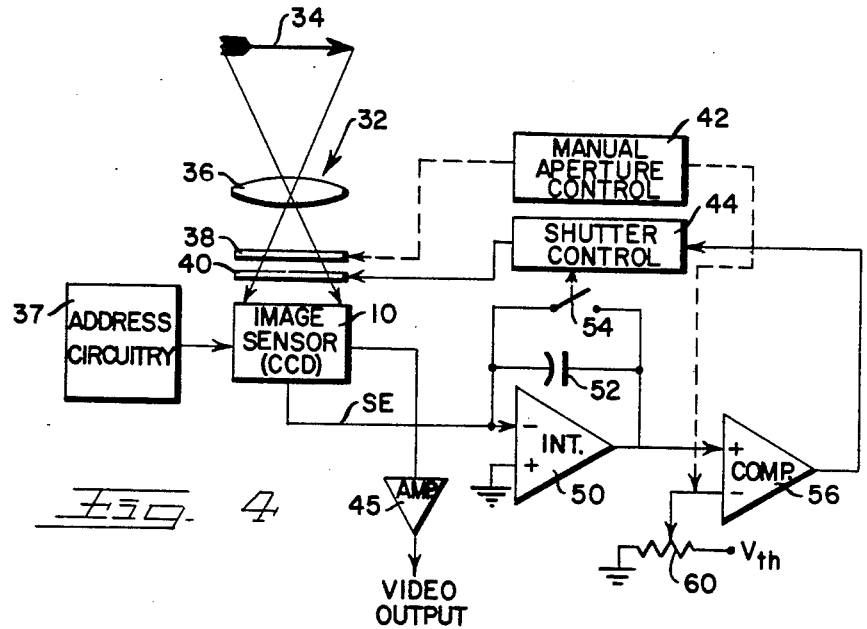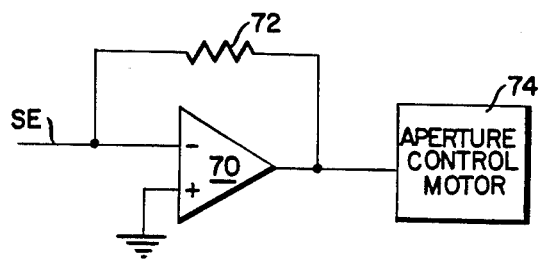

APPARATUS FOR CONTROLLING EXPOSURE OF A SOLID STATE IMAGE SENSOR ARRAY

BACKGROUND OF THE INVENTION

The present invention relates to improvements in apparatus for controlling the exposure of solid state image sensor arrays of the type proposed for use in electronic cameras, facsimile equipment, and the like.

Linear and areal arrays of solid state photosensors (e.g. charge coupled devices (CCD's) and charge injection devices (CID's)) have now been produced with packing densities sufficient to warrent their use as high resolution optoelectric image converters in electronic cameras and facsimile equipment for converting optical images to electronic form. To prevent overexposure of these arrays and thereby prevent the so-called "blooming" of photosites and the distortion resulting therefrom, there is a need to maintain the exposure level of the array within certain tolerances.

In U.S. Pat. No. 4,131,919, issued to G. A. Lloyd et al, there is disclosed an electronic still camera in which an image formed on a charge coupled device array is converted to electronic form and recorded on a magnetic storage medium. The exposure of the CCD array is controlled by a conventional photoelectric circuit which controls the opening in a diaphragm positioned in front of the array. While this technique of exposure control is technically sound, the use of an auxiliary photoelectric exposure control circuit is undesirable, at least from the standpoint that it can add significantly to the manufacturing cost of the camera.

It has been proposed heretofore to use a solid state image sensor array as the light-sensitive element in exposure control systems of the type used in photographic cameras. For example, U.S. Pat. No. 4,047,187, issued to Mashimo et al, discloses the use of a CCD array to control both the exposure of a photographic film and the focus of the camera's lens. In the camera of Mashimo et al, the CCD array is relatively small in terms of the number of photosites, and its output is dedicated solely to the exposure control and autofocus functions using the output of the array to produce a television display of the image focused thereon.

U.S. Pat. No. 4,005,443, issued to Albrecht, discloses a photographic camera which, like the above-mentioned camera of Mashimo et al, employs a small solid state imaging array to produce signals for automatically focusing the camera lens. Additionally, the scanned output of the array is integrated to provide an exposure control signal which, by means of an adjustable aperture, prevents overexposure of the array itself. Here again, however, the array is dedicated to functions other than that of recording or displaying the image of information focused thereon.

SUMMARY OF THE INVENTION

An object of the invention is to control the exposure of a solid state image sensor array of the type proposed for use in electronic cameras and the like without resorting to the use of an auxiliary photoelectric exposure control circuit.

Toward this end, apparatus is provided for monitoring the total current in the semiconductive substrate of an irradiated solid state image sensor array. It has been found that a current can be detected in the semiconductive substrate of an irradiated solid state image sensor array at exposure levels substantially less than that which would produce overall saturation or localized "blooming" of the photosites of the array, and that this current is proportional to the instantaneous exposure level of the array. Apparatus is provided for monitoring the substrate current at an electrode which is common to all photosites and for providing an output signal proportional thereto. This signal, being representative of the total substrate current and, hence, the average exposure of the photosites in the array, is used to adjust an aperture and/or a shutter to control the exposure of the array.

The exposure control apparatus of the invention is especially useful in television and electronic still cameras in which a solid state image sensor array, such as a CCD or CID array provides video output signals for recording and/or display. Since the apparatus of the invention makes use of a current in the array which normally goes undetected and unused, there is an inherent cost-savings over the other exposure control devices and schemes which require an auxiliary light-sensing element. Further, since the array produces an exposure control signal while it simultaneously records an image, there is no need for a time delay between the illumination sensing and image recordng functions. Furthermore, since the same element that is recording the image is also providing the exposure control signal, there is no need to calibrate the exposure control apparatus to take into account any differences between the spectral response of the image recorder and the light-sensitive element of the exposure control device.

The invention and its various other advantages will become more apparent to those skilled in the art from the following detailed description of preferred embodiments, reference being made to the accompanying drawings.

BRIEF DESCRIPTION OF THE DRAWINGS

FIGS. 3a, 3b and 3c represent waveforms of electric signals applied to the sensor array;

FIG. 4 is a schematic illustration of an electronic camera embodying the exposure control apparatus of the invention; and FIG. 5 is a block diagram illustrating certain preferred circuitry used to control the level of exposure of a solid state imaging array.

DETAILED DESCRIPTION OF PREFERRED EMBODIMENTS

Figure 1:
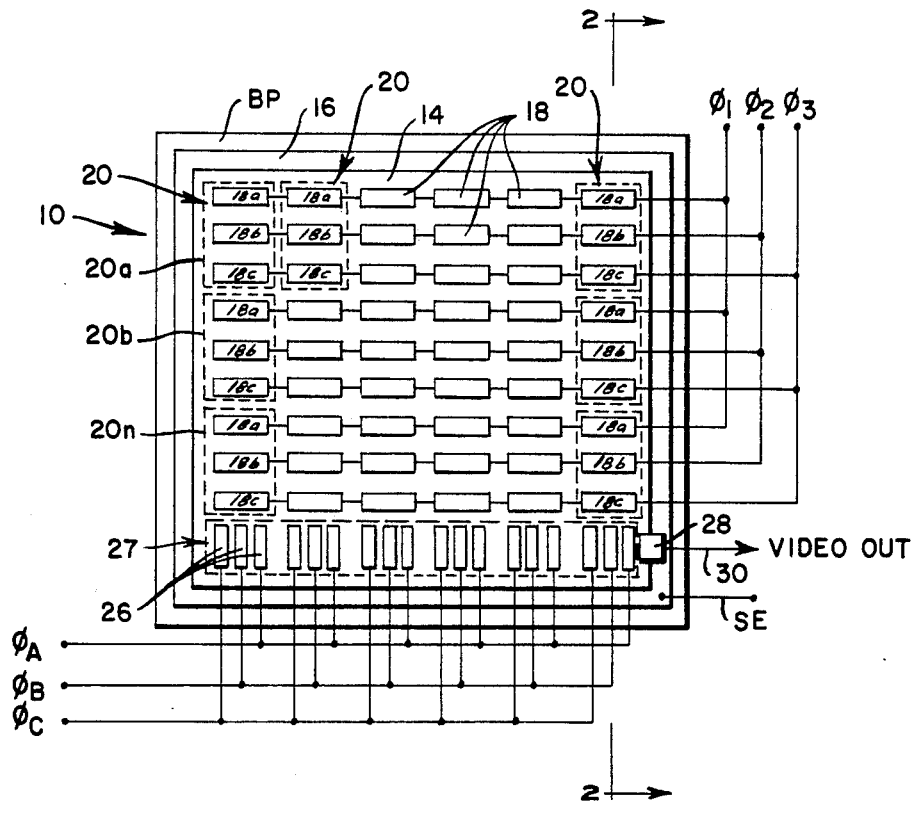
FIG. 1 shows, in simplified form, a top view of a conventional solid state image sensor array.
Figure 2:
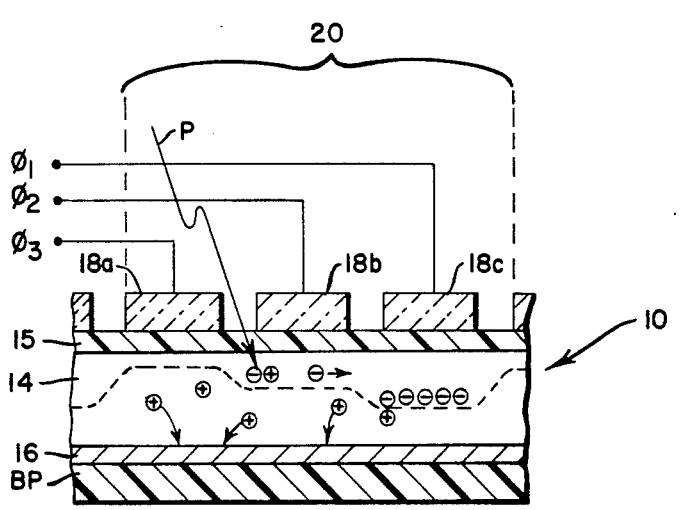
FIG. 2 is a partial cross-sectional view of the sensor array shown in FIG. 1 taken along the section line 2—2.

Referring to FIGS. 1 and 2, there is schematically illustrated an areal solid state image sensor array 10. The particular array shown is of the conventional three-phase surface channel charge coupled device (SCCD) variety, as is commercially available, for example, from Fairchild Semi-conductors of Mountain View, Calif. It will be apparent from the ensuing description, however, that the specific type of solid state imaging array, whether 1, 2 or 3 phase, surface or buried channel, linear or areal, CCD or CID, does not affect the operability of the invention.

Array 10 comprises a substrate 14 of semiconductive material, such as p-type silicon. The upper surface of the semiconductive substrate is thermally oxidized to provide a silicon dioxide layer 15, as shown in FIG. 2.

In accordance with the present invention, the bottom surface of the semiconductive substrate 14 adheres to a non-conductive base plate BP by an adhesive layer 16 which comprises a conductive material, such as conductive epoxy, or gold eutetic. Layer 16 is at least coextensive with the bottom side of substrate 14 and, owing to its conductive properties, provides a base electrode which is common to all of the photosites (described below) of the array. Contact with layer 16 is made via a conductive lead SE.

Disposed on the oxidized surface of substrate 14 (e.g. by a standard vacuum deposition and photoetching process) is a multitude of spaced electrodes 18 arranged to form an orderly rectangular array. Typically, electrodes 18 are made of polysilicon which is optically transparent to wavelengths longer than about 450 Angstroms. Every three electrodes (e.g. electrodes 18a, 18b, and 18c) define, together with those portions of the substrate beneath them, a photosite 20. (Note, to simplify the drawing, only 18 photosites are shown; it will be appreciated that conventional areal arrays are commercially available with more than 45,000 photosites. One such array is the Fairchild CCD-211).

As shown in FIG. 1, all of the electrodes 18a comprising a horizontal row are connected in series to an input lead $\phi_1$. Similarly, all of the electrodes 18b are connected in series to an input lead $\phi_2$, and electrodes 18c are connected in series to an input lead $\phi_3$. Also disposed on the oxidized surface of substrate 1 is a linear array of electrodes 26 which define a part of an output register 27, the function of which is described below. For a more thorough description and understanding of the constructional and operating details of SCCD imaging arrays, reference is made to the text entitled "Charge Transfer Devices", by Sequin and Tompsett, Academic Press, Inc., (1975).

When used in an electronic still or television camera, an image of a scene to be recorded or displayed is focused on the upper surface of the array. Image light passing through or between electrodes 18 is absorbed by the silicon layer, thereby producing electron-hole pairs. During the exposure period, leads $\phi_1$, $\phi_2$ and $\phi_3$ are connected to positive sources (not shown), whereby corresponding voltage levels are applied to electrodes 18a, 18b and 18c, respectively. When positive voltages are applied to electrodes 18, majority carriers (holes in the case of a p-type substrate) are repelled from the $Si/SiO_2$ interface, thereby producing a depletion region in the Si substrate directly beneath these electrodes. Conventionally, these depletion regions are referred to as "potential wells", such wells being indicated by the phantom line shown in FIG. 2. The depth of these potential wells is proportional to the voltage applied to each electrode 18, the higher the voltage, the deeper the well.

Upon imagewise exposing array 10, the minority carrier photocurrent will be in the form of electrons. These electrons will accumulate at a location with the highest interface potential (i.e. the deepest well). The number of electrons accumulated in a potential well, often referred to as the charge signal, will be determined by the photocurrent of the photosite with which it is associated. This photocurrent, in turn, is determined by the total exposure of the photosite.

Upon terminating the exposure of array 10, the accumulated charge signal in each photosite can be read out serially by applying similar periodic signals to leads $\phi_1$, $\phi_2$ and $\phi_3$, each signal being shifted in phase by 120° with respect to the other signals. Suitable waveforms for these signals are shown in FIGS. 3a-c. Upon applying these periodic signals to electrodes 18a, 18b and 18c, the charge signal in each photosite of a horizontal row is shifted to an adjacent photosite in an adjacent horizontal row (e.g. from photosite 20a to photosite 20b) and the charge signals in each of the photosites of the last horizontal row (i.e. photosites 20n) are shifted in parallel to an output register 27. As indicated above, register 27 comprises a linear array of electrodes 26 arranged in groups of three. By applying similar periodic waveforms to leads $\phi_A$, $\phi_B$ and $\phi_C$, each lead being connected to the output register electrodes in the manner shown, each row of photosites is read out serially via output gate 28, to provide a video output signal 30. Since the manner in which the charge signal is clocked out of the imaging array forms no part of this invention, no further description is believed warranted. For further operating details of the array, reference is made to the above-referenced text.

During the imagewise exposure of the array, a part of the majority carrier photocurrent (i.e. the holes in a p-type substrate) will be consumed in decreasing the width of the depletion region. The remainder of the majority carrier photocurrent, however, will flow out of the semiconductor lead SE, giving rise to an externally measurable current. The amplitude of this current has been found to be proportional to the average level of exposure of each photosite in the entire array. A signal proportional to the majority carrier photocurrent which is detectable at lead SE is used to provide exposure control in accordance with the present invention.

Referring to FIG. 4, sensor array 10 is shown associated with an image-forming system 32 which imagewise exposes the photosites of the array. The image may be that of a scene, indicated schematically by an arrow 34. The image-forming system includes a lens 36, an adjustable aperture 38, and a shutter 40. Aperture 38 is used to vary the intensity of the energy reaching the array. The aperture and shutter may be similar to those found in conventional photographic cameras. The size of the aperture is controlled manually by an aperture control mechanism 42, and the exposure time provided by the shutter is controlled automatically by a shutter motor 44. Mechanism 42 and motor 44 and their associated linkages to the aperture and shutter may be of conventional design, as found in most cameras.

The image sensor array 10 is operated by address circuitry 37 of the type described above to produce a video output in a conventional manner. The video output, upon being amplified by a conventional amplifier 45, is applied to a television processor, recording or display apparatus, as desired. The base electrode SE of the image sensor array is connected to a point of reference potential, indicated as ground, through the low impedance input of an operational amplifier 50. This amplifier is connected as an integrator by a capacitor 52 which is connected between the amplifier's output and input terminals. A switch 54 connected across capacitor 52 serves to reset the integrator at the beginning of an exposure period by discharging the capacitor. Switch 54 is coupled to the shutter motor. Upon closing switch 44, the shutter motor opens the shutter to initiate the exposure period. As the charge signal accumulates in the photosites of the array during the exposure interval, the aforementioned substrate current, as represented by the current in lead SE, is integrated by amplifier 50 to produce a ramp waveform which appears at the input of comparator 56. The other input to the comparator is connected to a reference voltage $V_{th}$ through a potentiometer 60. When the amplitude of the integrated output signal from the integrating amplifier reaches a predetermined threshold, the comparator provides an output voltage level which actuates the shutter motor and closes the shutter. Since the total exposure of the image sensor array is proportional to the integrated charge signal provided by the integrating amplifier 40, the shutter 40 can be closed whenever a desired exposure is reached by adjusting the potentiometer 60. Both overexposure, which causes blooming at some of the photosites, and underexposure, which produces a low contrast display, are substantially eliminated by means of this exposure control apparatus.

If the size of aperture 28 is varied by the manual aperture control 42, a linkage, shown in phantom line, serves to adjust potentiometer 60 so as to increase or decrease the threshold at which the comparator 56 provides an output signal to the shutter motor. Thus, the exposure time provided by shutter 30 will depend upon the aperture setting provided by aperture control 38.

Referring now to FIG. 5, a simplified exposure control apparatus is provided which is suitable for use, for example, in cameras having a fixed exposure time, such as motion picture cameras. An operational amplifier 70 is connected to the base electrode SE of the image sensor 10 and provides a low impedance path to a reference potential, shown as ground. This operational amplifier is provided with resistance feedback via resistor 72, and converts the substrate current in the array to a voltage which controls a voltage-responsive motor 74 which determines the size of an aperture positioned in front of the image sensor. Motor 74 is bi-directional in the sense that it is provided at its input with a circuit which acts to increase the size of the aperture when the output voltge from the operational amplifier increases above a predetermined level, and to decrease the size of the aperture when the output voltage drops below a predetermined level. Such potential-sensitive polarity reversing circuits are of conventional design and, hence, need not be described in detail herein.

From the foregoing description, it is apparent that there is disclosed herein an improved exposure control apparatus which is useful in electronic still and television cameras, facsimile, etc., for controlling the exposure of a solid state image sensor array. The image sensor array operates to provide a video output signal while at the same time provide a signal for exposure control purposes without interfering with its principal function of providing a video output signal. In addition to controlling the exposure automatically, the apparatus of the invention can be readily adapted to provide a visual indication to the operator, whereby the exposure parameters can be manually controlled to adjust the exposure of the image sensor. Further, it should be understood that the invention, while described with particular reference to areal imaging arrays, has equal utility in controlling the exposure of linear arrays. Other modifications and alterations will undoubtedly suggest themselves to those skilled in the art without departing from the spirit of the invention, as defined by the following claims.

What is claimed is:

1. Apparatus for controlling the exposure of a solid state image sensor array of the type which includes a photosensitive semiconductive substrate having disposed on one surface thereof a plurality of photosites, said apparatus comprising means for producing a signal representative of the substrate current resulting from an imagewise exposure of said photosites, means for integrating said signal to provide a ramp signal having an instantaneous amplitude representative of the instantaneous average exposure of said photosites, and means responsive to said ramp signal for controlling the exposure of said sensor array.

2. The apparatus as defined in claim 1 wherein said controlling means comprises means for controlling the exposure time of said photosites.

3. The apparatus as defined in claim 1 wherein said controlling means comprises an adjustable aperture and means for adjusting said aperture in response to the amplitude of said ramp signal.

4. The apparatus as defined in claim 1 wherein said sensor array further comprises a layer of conductive material disposed on the surface of said substrate opposite said one surface, said layer being coextensive with the electrodes of said photosites, and wherein said signal producing means is connected to said conductive layer.

5. The apparatus as defined in claim 1 wherein said integrating means comprises an operational amplifier.

6. The apparatus as defined in claim 1 wherein said controlling means comprises a shutter for controlling the exposure time of said sensor array, means for resetting the exposure time of said sensor array, means for resetting said integrating means when said shutter is initially opened, and means for closing said shutter when said ramp signal exceeds a predetermined threshold level.

7. The apparatus as defined in claim 6 further comprising an aperture which is adjustable in size for controlling the intensity of exposure of said sensor array, and means responsive to the size of said aperture for adjusting said threshold level.

8. The apparatus as set forth in claim 4 wherein said integrating means comprises an operational amplifier having one of its input terminals connected to said conductive layer and the other to a reference potential, and a capacitor connected between the output of said operational amplifier and the input which is connected to said conductive layer, and wherein said controlling means comprises a comparator having one of its input terminals connected to the output of said operational amplifier and the other of its input terminals connected to a reference voltage, whereby an exposure controlling signal is provided when the output of said operational amplifier exceeds a threshold level determined by said reference voltage.

* * * * *